United States Patent
Iguchi

(10) Patent No.: US 11,243,033 B2
(45) Date of Patent: Feb. 8, 2022

(54) HEAT EXCHANGER AND WATER HEATING APPARATUS INCLUDING SAME

(71) Applicant: NORITZ CORPORATION, Hyogo (JP)

(72) Inventor: Masahiro Iguchi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 17/072,048

(22) Filed: Oct. 16, 2020

(65) Prior Publication Data
US 2021/0156623 A1 May 27, 2021

(30) Foreign Application Priority Data
Nov. 26, 2019 (JP) .............................. JP2019-213261

(51) Int. Cl.
*F28F 1/26* (2006.01)
*F24H 1/10* (2006.01)
*F28F 9/02* (2006.01)

(52) U.S. Cl.
CPC ............... *F28F 1/26* (2013.01); *F24H 1/107* (2013.01); *F28F 2009/0297* (2013.01)

(58) Field of Classification Search
CPC ........ F28F 1/26; F28F 2009/0297; F28F 1/34; F28F 9/027; F28F 1/32; F28F 21/083; F28F 1/02; F24H 1/107; F28D 7/024; F28D 7/1692
See application file for complete search history.

(56) References Cited

U.S. PATENT DOCUMENTS

| 6,093,912 | A  | * | 7/2000  | Potchen  | B05C 11/1042 |
|           |    |   |         |          | 219/422      |
| 9,677,819 | B2 | * | 6/2017  | Lee      | F28F 9/027   |
| 9,752,835 | B2 | * | 9/2017  | Waldman  | F16L 27/11   |
| 10,254,053| B2 | * | 4/2019  | Okamoto  | F28F 21/083  |
| 10,443,956| B2 | * | 10/2019 | Yoshioka | F28D 1/05366 |
| 10,794,640| B2 | * | 10/2020 | Kondo    | F28D 1/0472  |

(Continued)

FOREIGN PATENT DOCUMENTS

| JP | S628577    | 1/1987 |
| JP | 2002228267 | 8/2002 |

(Continued)

*Primary Examiner* — Jon T. Schermerhorn, Jr.
(74) *Attorney, Agent, or Firm* — JCIPRNET

(57) ABSTRACT

A heat exchanger includes fins and a plurality of pairs of cut-and-raised parts. Each pair of the cut-and-raised parts are positioned on both left and right sides in a width direction on a downstream side in a heating gas flowing direction around an outer circumference surface of each of upstream pipe body parts and face a downstream part on the outer circumference surface with a first gap therebetween. A width between upstream end parts of each pair of the cut-and-raised parts is larger than an outer diameter of each of the upstream pipe body parts. In addition, each pair of the cut-and-raised parts are inclined such that a width between downstream end parts becomes smaller than the width between the upstream end parts. A heating gas passing part having a width narrower than a dimension therebetween is provided in a region between two adjacent upstream pipe body parts.

9 Claims, 5 Drawing Sheets

(56) References Cited

U.S. PATENT DOCUMENTS

| | | | | |
|---|---|---|---|---|
| 2014/0190425 A1* | 7/2014 | Oohigashi | ............... | F28F 1/325 |
| | | | | 122/18.4 |
| 2014/0216699 A1* | 8/2014 | Lee | ............... | F28D 7/024 |
| | | | | 165/163 |
| 2016/0273850 A1* | 9/2016 | Okamoto | ............... | F28F 21/083 |
| 2021/0108865 A1* | 4/2021 | Akagi | ............... | F28F 3/06 |

FOREIGN PATENT DOCUMENTS

| | | |
|---|---|---|
| JP | 6314106 | 4/2018 |
| JP | 2018080866 | 5/2018 |

\* cited by examiner

HEAT EXCHANGER AND WATER HEATING APPARATUS INCLUDING SAME

CROSS-REFERENCE TO RELATED APPLICATION

This application claims the priority of Japan patent application serial no. 2019-213261, filed on Nov. 26, 2019. The entirety of the above-mentioned patent application is hereby incorporated by reference herein and made a part of this specification.

BACKGROUND

Field of the Invention

The disclosure relates to a heat exchanger using a so-called fin tube-type heat transfer pipe, and a water heating apparatus such as a water heater using the same.

Description of the Related Art

Regarding a specific example of a heat exchanger constituting a water heating apparatus, FIG. 8 shows a heat exchanger 9 (refer to Japanese Unexamined Utility Model Registration Application Publication No. S62-8577 and Japanese Patent No. 6314106).

In this heat exchanger 9, a plurality of fins 90 having a plate shape is penetrated by and bonded to heat transfer pipes Te. When combustion gas (heating gas) generated by a burner (not shown in the diagram) is caused to move forward toward the heat exchanger 9, heat recovery is performed by the fins 90 and the heat transfer pipes Te from the combustion gas, water circulating inside the heat transfer pipes Te is heated, and hot water is generated.

The heat transfer pipes Te are configured to have upstream pipe body parts 8A and downstream pipe body parts 8B in a zigzag arrangement in two stages on the upper and lower sides in a combustion gas flowing direction. According to such a configuration, combustion gas can be caused to directly act on both the upstream pipe body parts 8A and the downstream pipe body parts 8B.

However, in the technology in the related art, as described below, there is still room for improvement.

First, heat recovery is performed when combustion gas acts on the upstream pipe body parts 8A from the upper side thereof. However, combustion gas does not efficiently act on a lower surface part 80 on a downstream side in the combustion gas flowing direction on outer circumference surfaces of the upstream pipe body parts 8A. For this reason, there is room for improvement in increasing a heat recovery amount of the upstream pipe body parts 8A and enhancing heat exchanging efficiency. Since the temperature of combustion gas is higher on the upstream pipe body parts 8A side than on the downstream pipe body parts 8B side, it is preferable to increase the heat recovery amount of the upstream pipe body parts 8A in order to efficiently enhance the heat exchanging efficiency.

Second, combustion gas which has passed through a region between two upstream pipe body parts 8A adjacent to each other acts on the downstream pipe body parts 8B. However, compared to combustion gas acting on the upstream pipe body parts 8A, a flow velocity v of this combustion gas is low. On the other hand, a heat recovery amount of the downstream pipe body parts 8B is further reduced as the flow rate v of combustion gas becomes lower. Therefore, the downstream pipe body parts 8B cannot be regarded as having a sufficient heat recovery amount, and there is also room for improvement in this regard.

In the related art, regarding means for enhancing the heat exchanging efficiency of a heat exchanger, for example, as described in Japanese Patent Laid-Open No. 2002-228267 and Japanese Patent Laid-Open No. 2018-80866, there are means of providing cut-and-raised parts in fins. Incidentally, none of these means can adequately resolve the foregoing problems.

Patent Documents

[Patent Document 1] Japanese Patent Utility Laid-open No. S62-8577
[Patent Document 2] Japanese Patent No. 6314106
[Patent Document 3] Japanese Patent Laid-Open No. 2002-228267
[Patent Document 4] Japanese Patent Laid-Open No. 2018-80866

SUMMARY

According to one of the embodiments of the disclosure, there is provided a heat exchanger including a case into which heating gas flows, a heat transfer pipe which has a plurality of pipe body parts arranged inside this case and lying side by side at intervals in a width direction intersecting a heating gas flowing direction and in which the plurality of pipe body parts includes a plurality of upstream pipe body parts and downstream pipe body parts in a zigzag arrangement in two stages in the heating gas flowing direction, and fins which are penetrated by and bonded to the plurality of pipe body parts. Each of the fins includes a plurality of pairs of cut-and-raised parts respectively corresponding to the plurality of upstream pipe body parts. Each pair of the cut-and-raised parts are provided apart from each other in the width direction at positions on a downstream side in the heating gas flowing direction around an outer circumference surface of each of the upstream pipe body parts, and each pair of the cut-and-raised parts face a downstream part on the outer circumference surface with a first gap therebetween. A first width between upstream end parts of each pair of the cut-and-raised parts in the heating gas flowing direction is larger than an outer diameter of each of the upstream pipe body parts, and each pair of the cut-and-raised parts are inclined such that a second width between downstream end parts of each pair of the cut-and-raised parts in the heating gas flowing direction becomes smaller than the first width. A heating gas passing part having a width narrower than a dimension between two adjacent upstream pipe body parts in the width direction and serving as a part where each pair of the cut-and-raised parts are not formed is provided in a region between the two adjacent upstream pipe body parts.

According to one of the embodiments of the disclosure, there is provided a water heating apparatus including the heat exchanger provided according to the first aspect of the disclosure.

Other features and advantages of the disclosure will become more apparent from the following description of an embodiment of the disclosure performed with reference to the accompanying drawings.

DESCRIPTION OF THE EMBODIMENT

The disclosure provides a heat exchanger capable of further enhancing heat exchanging efficiency than the related art using a simple means, and a water heating apparatus including the same.

In order to solve the foregoing problems, the following technological means are devised in one of the embodiments of the disclosure.

In one of the embodiments, the downstream end parts of each pair of the cut-and-raised parts are positioned on the downstream side in the heating gas flowing direction relative to the downstream part on the outer circumference surface of each of the upstream pipe body parts in the heating gas flowing direction.

In one of the embodiments, in each of the fins, regions leading to parts in a vicinity of the outer circumference surfaces of the downstream pipe body parts from each pair of the cut-and-raised parts, the heating gas passing part, and upstream regions of the heating gas passing parts in the heating gas flowing direction be formed as first cutout parts connected in series.

In one of the embodiments, each of the fins further include additional cut-and-raised parts which are provided on the downstream side of second gaps, formed between the downstream end parts of each pair of the cut-and-raised parts, in the heating gas flowing direction and are capable of causing the heating gas to move forward toward the outer circumference surfaces of the downstream pipe body parts after causing the heating gas passed through the second gap to collide therewith.

In one of the embodiments, the additional cut-and-raised parts have substantially a same height in the heating gas flowing direction as downstream end parts on the outer circumference surfaces of the downstream pipe body parts in the heating gas flowing direction.

In one of the embodiments, in each of the fins, a slit is provided at a position on an upstream side in the heating gas flowing direction relative the additional cut-and-raised parts.

In one of the embodiments, in an end edge part on the downstream side of each of the fins in the heating gas flowing direction, parts corresponding to the additional cut-and-raised parts have uneven shapes formed as second cutout parts that are further recessed than other parts.

In one of the embodiments, the case, the heat transfer pipe, and the fins be made of stainless steel.

Hereinafter, a preferable embodiment of the disclosure will be specifically described with reference to the drawings.

Figure 1:
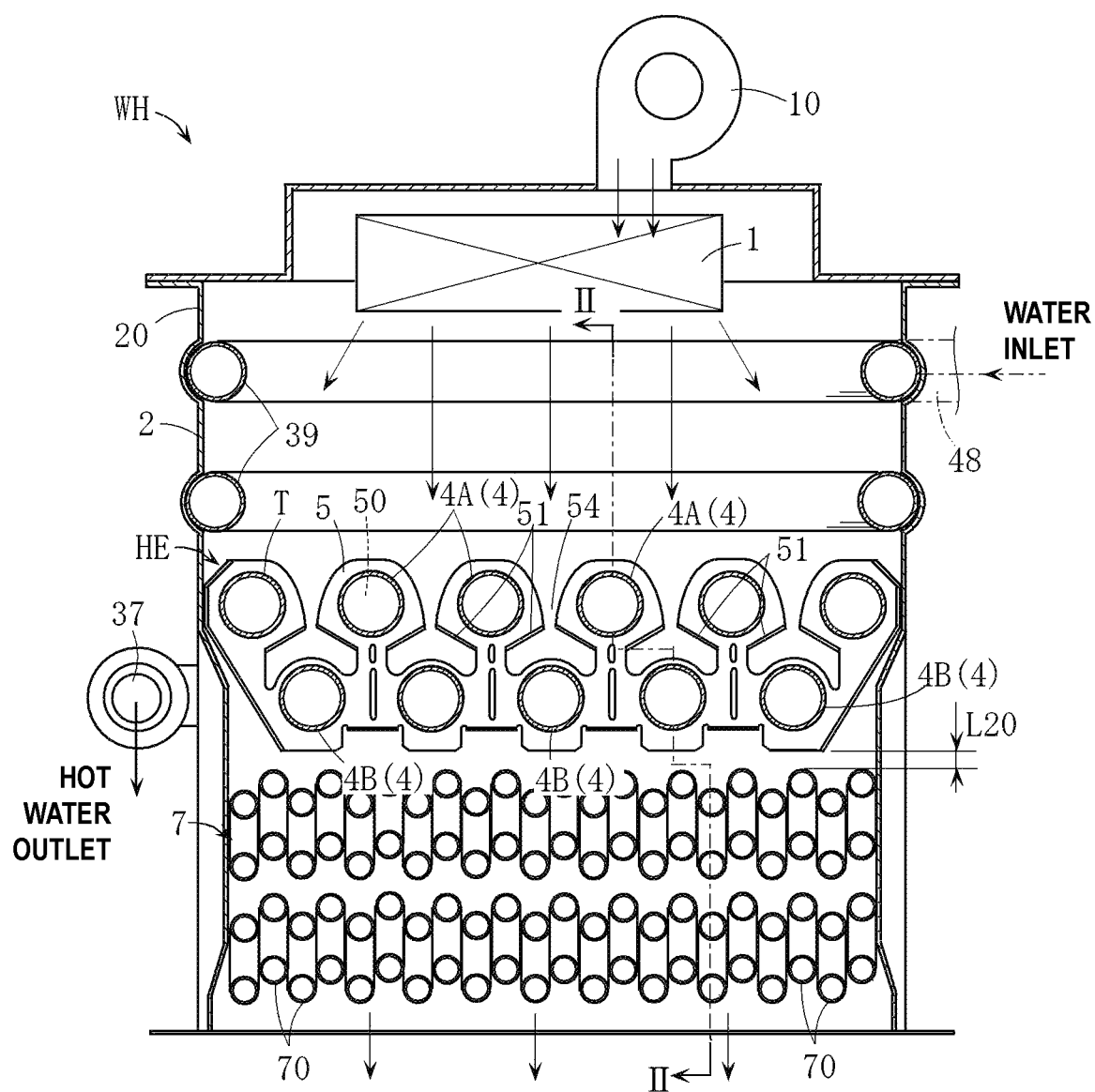
FIG. 1 is a cross-sectional view of a main part showing an example of a water heating apparatus of the disclosure.
Figure 2:
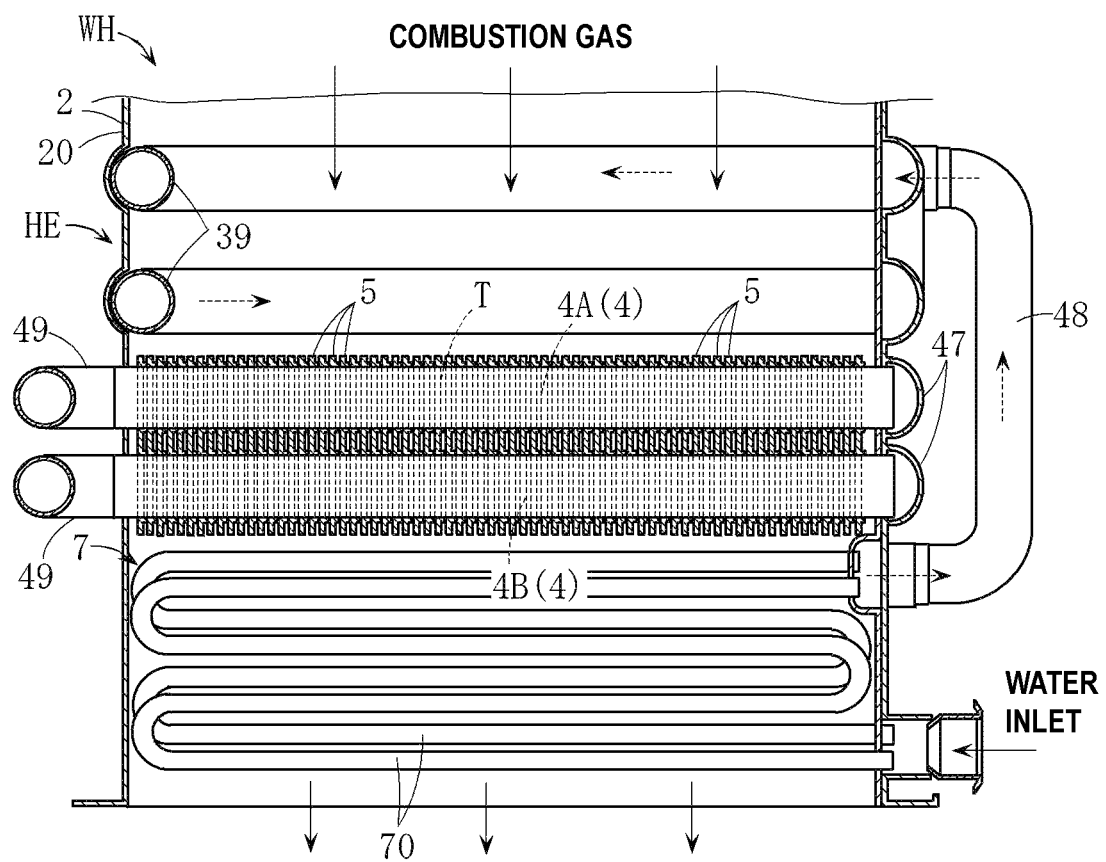
FIG. 2 is a cross-sectional view along II-II in FIG. 1.

A water heating apparatus WH shown in FIGS. 1 and 2 includes a burner 1, a heat exchanger HE serving as a primary heat exchanger, and a secondary heat exchanger 7. The heat exchanger HE corresponds to an example of the heat exchanger according to the disclosure, and the secondary heat exchanger 7 does not correspond to the heat exchanger according to the disclosure.

The burner 1 is a known reverse combustion-type burner in the related art. In this burner 1, for example, ignition is performed when fuel gas is incorporated into combustion air discharged from a fan 10, and combustion gas serving as heating gas is supplied downward to the inside of a case 2 from this burner 1.

In addition to the foregoing case 2, the heat exchanger HE includes a heat transfer pipe T, a plurality of fins 5, and a plurality of body pipes 39, and these are made of stainless steel, for example. In addition to heat absorption for heating water, the body pipes 39 play a role of cooling a side wall part 20 of the case 2 and are provided along an inner surface of the side wall part 20 of the case 2. Water which has passed through a plurality of heat transfer pipes 70 of the secondary heat exchanger 7 is supplied to the body pipes 39 via a connection pipe 48. This water flows into the heat transfer pipe T after passing through the body pipes 39 and arrives at a water outlet 37, thereby being output.

The secondary heat exchanger 7 is provided to further recover latent heat from combustion gas after heat recovery (recovery of sensible heat) is performed from the heat exchanger HE and is configured to have the plurality of heat transfer pipes 70 disposed below the heat exchanger HE inside the case 2. For example, the heat transfer pipes 70 are heat transfer pipes 70 having a meandering shape.

The heat transfer pipe T of the heat exchanger HE has a configuration in which a plurality of straight pipe body parts 4 lying transversely side by side inside the case 2 in a vertical direction and a horizontal direction is connected in series via a bent pipe 49, a header part 47 provided in the case 2, and the like. The plurality of pipe body parts 4 is in a zigzag arrangement in two stages on the upper and lower sides. In the present embodiment, since a combustion gas flowing direction (heating gas flowing direction) is directed downward, the pipe body parts 4 on an upper stage side serve as upstream pipe body parts 4 (4A) and the pipe body parts 4 on a lower stage side serve as downstream pipe body parts 4 (4B).

Figure 3:
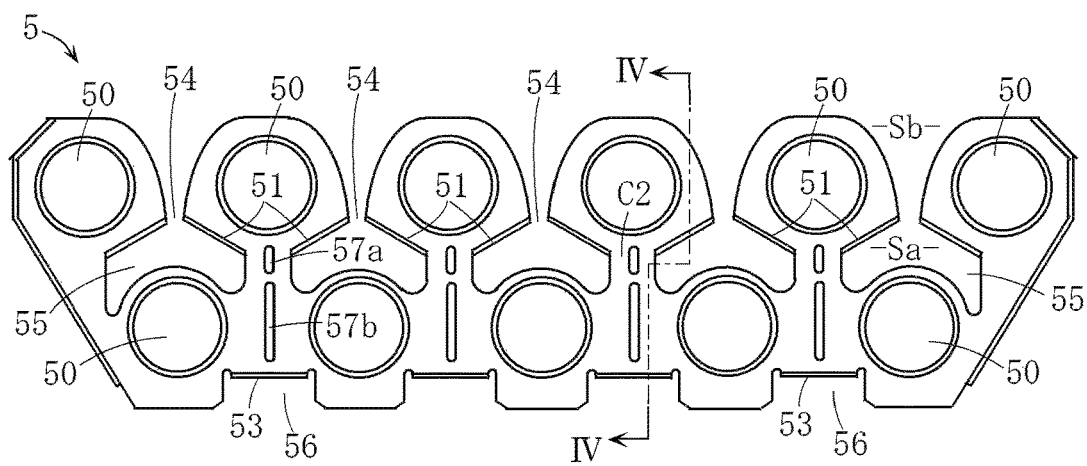
FIG. 3 is a front view of a fin used in the water heating apparatus shown in FIGS. 1 and 2.
Figure 4:
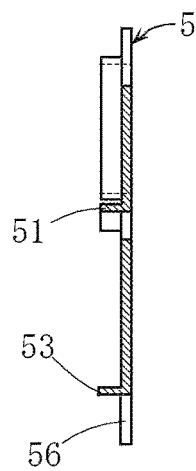
FIG. 4 is a cross-sectional view along IV-IV in FIG. 3.
Figure 5:
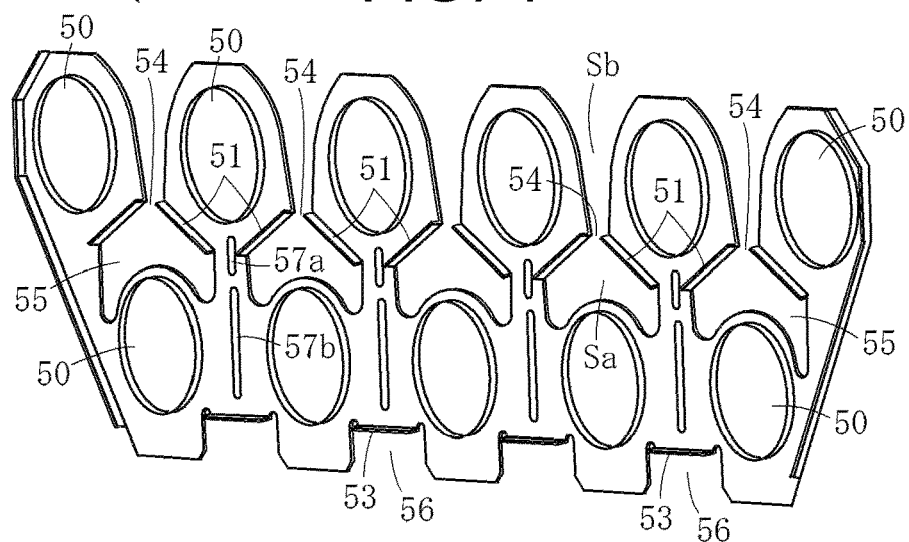
FIG. 5 is a perspective view of the fin shown in FIG. 3.

The plurality of pipe body parts 4 penetrates the plurality of fins 5, which is brazed to these pipe body parts 4, and lies side by side at suitable intervals in an axial length direction of the pipe body parts 4. As is clearly shown in FIGS. 3 to 5, each of the fins 5 includes a plurality of penetration holes 50, through which the pipe body parts 4 is inserted, in a zigzag arrangement in two stages on the upper and lower sides, a plurality of pairs of cut-and-raised parts 51, additional cut-and-raised parts 53, a plurality of heating gas passing parts 54, a plurality of first and second cutout parts 55 and 56, and a plurality of slit parts 57a and 57b.

Specific configurations of each of the foregoing parts of the fin 5, a plurality of upstream pipe body parts 4A, and the downstream pipe body parts 4B will be described in detail with reference to FIG. 6.

The cut-and-raised parts 51 in each pair are parts realized by bending parts of the fin 5 in a thickness direction of the fin 5. The cut-and-raised parts 51 in each pair are respectively positioned on both left and right sides on a downstream side in the heating gas flowing direction around the outer circumference surface 4a of the upstream pipe body part 4A and closely face a lower surface part 4a' (downstream part) on the outer circumference surface 4a with a first gap C1 therebetween. The pairs of cut-and-raised parts 51 are inclined such that a second width L2 between downstream end parts 51b becomes smaller than a first width L1 between upstream end parts 51a thereof. The pairs of cut-and-raised parts 51 are bilaterally symmetrical, but the disclosure is not limited thereto, and there may be a difference to a certain degree in their shape, size, and the like.

The foregoing first width L1 is larger than an outer diameter D of the upstream pipe body parts 4A. In a width direction of the heat exchanger HE, the upstream end parts 51a of the pairs of cut-and-raised parts 51 are at positions protruding beyond the outer circumference surfaces of the upstream pipe body parts 4A by a suitable dimension L3. According to this configuration, some combustion gas which has moved forward toward the heat exchanger HE hits the pairs of cut-and-raised parts 51 and is efficiently guided to the first gaps C1 by them.

It is preferable that the downstream end parts 51b of the cut-and-raised parts 51 be positioned below lower end parts on the outer circumference surfaces 4a of the upstream pipe body parts 4A. According to this configuration, combustion gas which has moved forward to the first gaps C1 can reliably act on the lower end parts on the outer circumference surfaces 4a.

The additional cut-and-raised parts 53 are provided at positions immediately below second gaps C2 formed between the downstream end parts 51b of the pairs of cut-and-raised parts 51, that is, at a height substantially equivalent to lower end parts P1 of the downstream pipe body parts 4B. Combustion gas which has passed through the second gaps C2 and moved forward to the downward side collides with these additional cut-and-raised parts 53 and acts on areas near the lower end parts P1 of the downstream pipe body parts 4B positioned on both left and right sides thereof.

The additional cut-and-raised parts 53 are formed by forming the second cutout parts 56 in a lower edge part of the fin 5 and bending an upper edge part thereof. For this reason, the lower edge part of the fin 5 has an uneven shape in a front view. The shape of this fin 5 causes an effect of promoting condensed water generated in accordance with heat recovery from combustion gas flowing downward from the lower edge part of the fin 5 and being eliminated. In FIG. 1, when a dimension L20 between the lower edge part of the fin 5 and the heat transfer pipes 70 of the secondary heat exchanger 7 is reduced, condensed water can be actively transferred from the lower edge part of the fin 5 to the heat transfer pipes 70, and elimination of the condensed water can be further promoted, and thus employing such a configuration is preferable.

Figure 6:
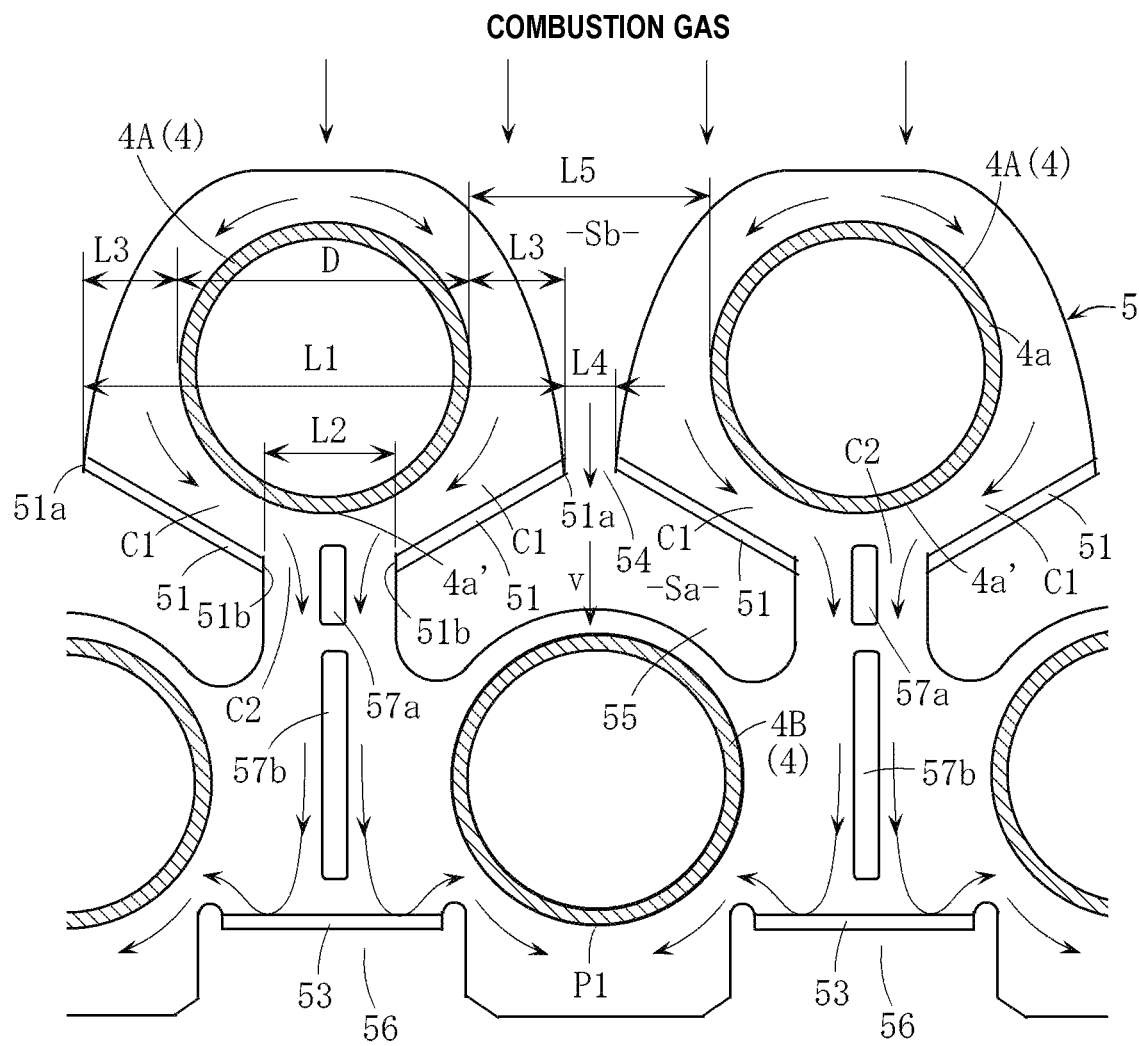
FIG. 6 is an enlarged cross-sectional view of the main part in FIG. 1.

In FIG. 6, parts of the cut-and-raised parts 51 in each pair are present in a region between two upstream pipe body parts 4A adjacent to each other. However, the heating gas passing parts 54 serving as parts where the cut-and-raised parts 51 in each pair are not formed are also formed. These heating gas passing parts 54 are positioned immediately above the downstream pipe body parts 4B such that combustion gas which has moved forward to the downward side moves further forward to the downward side and collides with the outer circumference surfaces of the downstream pipe body parts 4B. A width L4 of the heating gas passing part 54 is smaller than a dimension L5 between the two upstream pipe body parts 4A. For this reason, a flow velocity v of combustion gas which has passed through the heating gas passing parts 54 to the downward side becomes higher than a flow velocity thereof in upper regions of the heating gas passing parts 54.

In each of the fins 5, the first cutout parts 55 are cut-out parts of regions Sa throughout parts in the vicinity of the outer circumference surfaces of the downstream pipe body parts 4B positioned below forming places of the pairs of cut-and-raised parts 51 from the forming places, regions of the heating gas passing parts 54, and upper regions Sb of the heating gas passing parts 54 (upstream regions of the heating gas passing parts 54 in the heating gas flowing direction) connected in series. Originally, the regions Sa, 54, and Sb of the fin 5 are regions in which the temperature is likely to be higher than other parts of the fin 5 when combustion gas is caused to act on the fin 5. The first cutout parts 55 are means for preventing such regions in which the temperature is likely to be high from being provided in the fin 5.

The slit parts 57a and 57b are provided at positions below the upstream pipe body parts 4A of the fin 5 and above the additional cut-and-raised parts 53 and have a vertically elongated shape. Effects of the slit parts 57a and 57b will be described below.

Next, effects of the foregoing water heating apparatus WH will be described.

First, combustion gas generated by the burner 1 moves forward to the downward side and arrives at the heat exchanger HE. Consequently, some of the combustion gas acts by directly colliding with upper surface parts on the outer circumference surfaces 4a of the upstream pipe body parts 4A and then moves forward to the downward side thereof. At this time, a great part of the combustion gas hits the pairs of cut-and-raised parts 51 and is guided to the first gaps C1. Some of the combustion gas which does not directly collide with the upstream pipe body parts 4A also hits the pairs of cut-and-raised parts 51 and is guided to the first gaps C1. In this manner, combustion gas which has entered the first gaps C1 flows along the lower surface parts 4a' (downstream parts) on the outer circumference surfaces 4a of the upstream pipe body parts 4A, and heat recovery is performed by these lower surface parts 4a'.

Since the downstream end parts 51b of the pairs of cut-and-raised parts 51 are positioned on the downstream side in the heating gas flowing direction from the lower surface parts 4a' on the outer circumference surfaces 4a of the upstream pipe body parts 4A, combustion gas which has entered the first gaps C1 flows along extended regions to the lower end parts on the outer circumference surfaces 4a. Therefore, heat recovery is performed utilizing the whole circumferences of the outer circumference surfaces of the upstream pipe body parts 4A, which is preferable in order to increase the heat recovery amount of the upstream pipe body parts 4A.

Another portion of the combustion gas which has moved forward toward the heat exchanger HE, which is not guided to the foregoing first gaps C1, passes through the heating gas passing parts 54 and arrives at upper parts on the outer circumference surfaces of the downstream pipe body parts 4B. At this time, as described above, the combustion gas acts on the downstream pipe body parts 4B in a state in which the flow velocity v is raised. Therefore, it is also possible to achieve an effect of increasing the heat recovery amount of the downstream pipe body parts 4B (the higher the flow velocity v, the higher the heat exchanging efficiency).

On the other hand, combustion gas which has passed through the second gaps C2 between the pairs of cut-and-raised parts 51 collides with the additional cut-and-raised parts 53 thereafter and causes a change in the flowing direction due to this collision, thereby acting on areas near the lower end parts P1 (downstream end parts) on the outer circumference surfaces of the downstream pipe body parts 4B. Therefore, the heat recovery amount utilizing the lower surface part (downstream parts) on the outer circumference surfaces of the downstream pipe body parts 4B also increases. As a result, also regarding the downstream pipe body parts 4B, similar to the upstream pipe body parts 4A, efficient heat recovery utilizing the whole circumferences of the outer circumference surfaces thereof is performed, and thus the heat exchanging efficiency of the heat exchanger HE can be enhanced.

In the fin 5, the first cutout parts 55 are formed. However, as described above, originally, the regions Sa, 54, and Sb having these first cutout parts 55 formed therein are regions in which the temperature is likely to be higher than other regions of the fin 5 when combustion gas acts on the fin 5. Since such regions are removed as the first cutout parts 55, the temperature distribution in the entire fin 5 can become uniform. When the temperature distribution in the fin 5 is not uniform, there is concern that significant distortion may be generated in the heat transfer pipe T. However, according to the present embodiment, such a situation can be prevented. In addition, when the temperature distribution in the fin 5 is made uniform, an effect of increasing the heat recovery amount can also be achieved. Further, since heat recovery is not performed from combustion gas due to the regions Sa, 54, and Sb, an effect of raising the temperature of combustion gas which arrives at the downstream pipe body parts 4B can also be achieved.

The slit parts 57a and 57b cause an effect of curbing a temperature increase in lower regions of the upstream pipe body parts 4A of the fin 5 compared to other parts of the fin 5. Therefore, a uniform temperature distribution in the entire fin 5 is further promoted. In addition, when combustion gas moves forward to the additional cut-and-raised parts 53 through the second gaps C2, this combustion gas moves forward along places where the slit parts 57a and 57b are formed. Therefore, the temperature of this combustion gas does not fall much at that time, and thus the temperature of combustion gas when it arrives at the additional cut-and-raised parts 53 can be maintained at a high temperature. Therefore, the temperature of combustion gas which collides with the additional cut-and-raised parts 53 and then acts on the downstream pipe body parts 4B can be increased, and the heat exchanging efficiency can be further enhanced.

Figure 7:
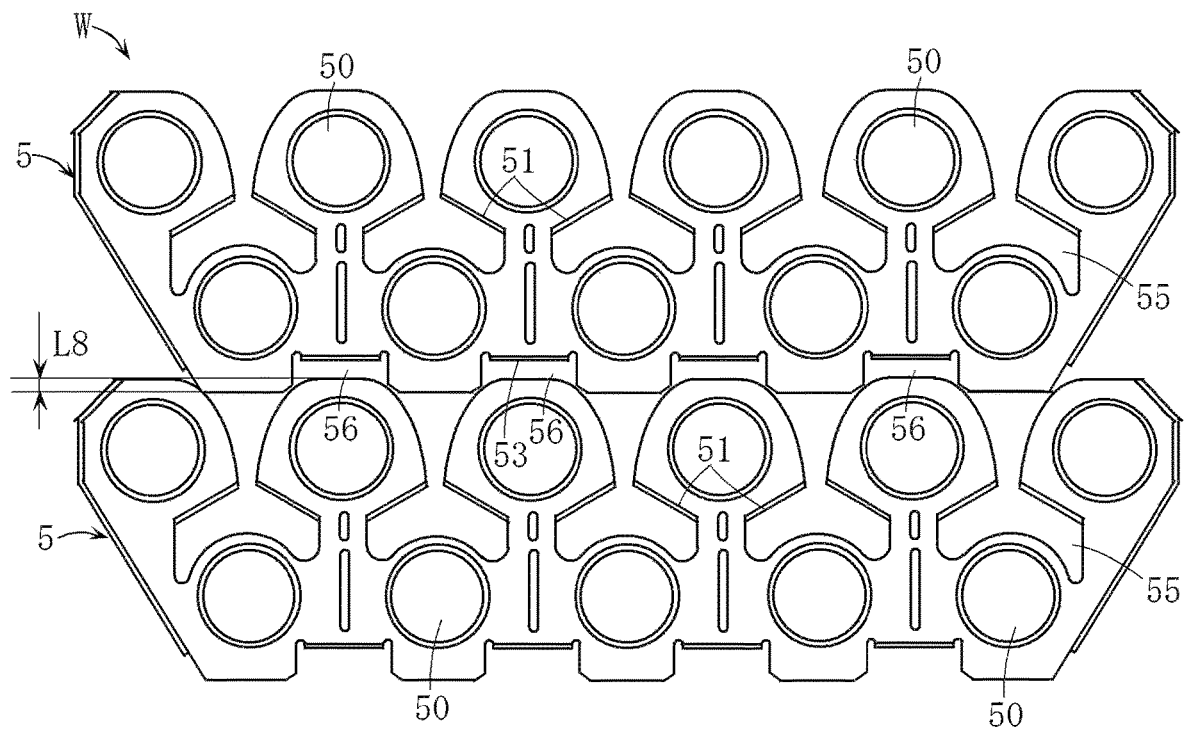
FIG. 7 is a front view showing an example of a middle step in manufacturing the fin shown in FIGS. 3 to 5.
Figure 8:
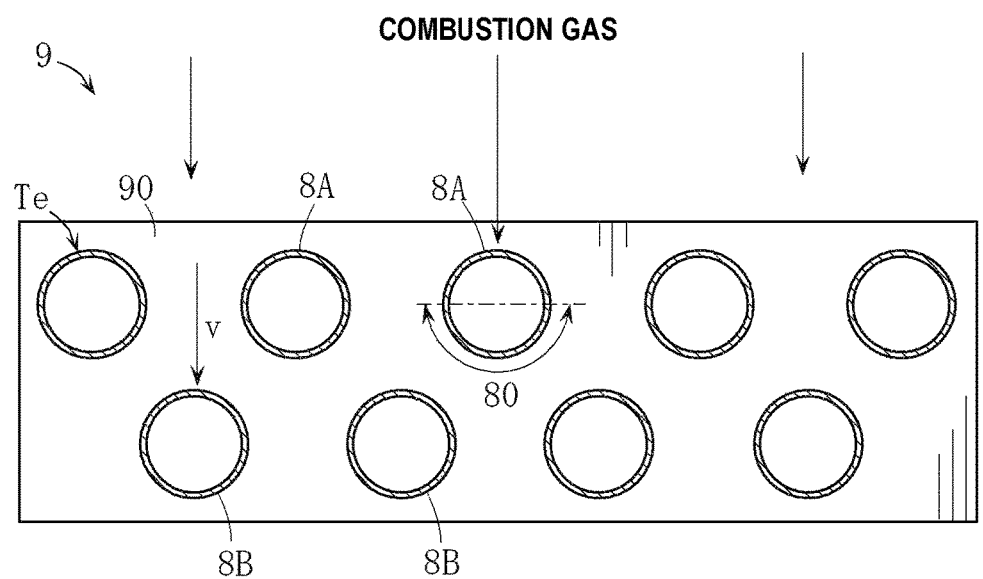
FIG. 8 is a front cross-sectional view showing an example of a technology in the related art.

FIG. 7 shows an example of a case in which a plurality of fins 5 is manufactured. When the fins 5 are manufactured, for example, an intermediate product W in which a plurality of fins 5 is connected in series is manufactured by performing punching or other kinds of press working on one metal plate, and the intermediate product W is cut and separated into a plurality of fins 5. In the intermediate product W shown in FIG. 7, two fins 5 on the upper and lower sides are connected to each other in a state in which a part of the fin 5 on the lower side has entered the second cutout parts 56 of the fin 5 on the upper side in FIG. 7 by a suitable dimension L8.

According to such a configuration, it is possible to achieve an advantage in which an array pitch between two fins 5 is reduced and the number of fins 5 manufactured from one metal plate can be increased. The fins 5 of the present embodiment can also be inexpensively manufactured using the technique described above.

The disclosure is not limited to the details of the embodiment described above. The specific configuration of each of the parts of the heat exchanger according to the disclosure, and the water heating apparatus including the same can be freely subjected to various design changes within the range intended for the disclosure.

In the embodiment described above, a reverse combustion-type apparatus in which a burner is disposed on the upper side in the heat exchanger is adopted, but the embodiment is not limited thereto. For example, a normal combustion-type apparatus in which a burner is disposed on the lower side in the heat exchanger can also be adopted. In this case, the heating gas flowing direction regarded in the disclosure becomes an upward direction.

The fins are not limited to those made of stainless steel, and other materials can be used. The heat transfer pipe need only include pipe body parts in a zigzag arrangement in two stages in the heating gas flowing direction as a plurality of pipe body parts penetrating the fins, and the specific number, the array pitch, and the like of the pipe body parts are not limited. In addition, pipe body parts independent from the foregoing pipe body parts in a zigzag arrangement in two stages may be additionally provided. Heating gas is not limited to combustion gas. For example, high-temperature exhaust gas or the like generated in a cogeneration system can also be adopted.

The heat exchanger according to the disclosure need not be a primary heat exchanger for sensible heat recovery provided in a stage in front of a secondary heat exchanger, regardless of the type of sensible heat recovery and latent heat recovery.

The water heating apparatus of the disclosure has a function of generating hot water by heating water and can be configured to serve as a bath water heater, a water heating apparatus for heating, and a water heating apparatus for snow melting, for example, in addition to a general water heater.

What is claimed is:

1. A heat exchanger comprising:
   a case into which heating gas flows;
   a heat transfer pipe which comprises a plurality of pipe body parts arranged inside the case and lying side by side at intervals in a width direction intersecting a heating gas flowing direction and in which the plurality of pipe body parts comprise a plurality of upstream pipe body parts and downstream pipe body parts in a zigzag arrangement in two stages in the heating gas flowing direction; and
   fins which are penetrated by and bonded to the plurality of pipe body parts,
   wherein each of the fins comprises a plurality of pairs of cut-and-raised parts respectively corresponding to the plurality of upstream pipe body parts,
   wherein each pair of the cut-and-raised parts are provided apart from each other in the width direction at positions on a downstream side in the heating gas flowing direction around an outer circumference surface of each of the upstream pipe body parts, and each pair of the cut-and-raised parts face a downstream part on the outer circumference surface with a first gap therebetween,
   wherein a first width between upstream end parts of each pair of the cut-and-raised parts in the heating gas flowing direction is larger than an outer diameter of each of the upstream pipe body parts, and each pair of the cut-and-raised parts are inclined such that a second width between downstream end parts of each pair of the cut-and-raised parts in the heating gas flowing direction becomes smaller than the first width, and
   wherein a heating gas passing part having a width narrower than a dimension between two adjacent upstream pipe body parts in the width direction and serving as a part where each pair of the cut-and-raised parts are not formed is provided in a region between the two adjacent upstream pipe body parts.

2. The heat exchanger according to claim 1,
wherein the downstream end parts of each pair of the cut-and-raised parts are positioned on the downstream side in the heating gas flowing direction relative to the downstream part on the outer circumference surface of each of the upstream pipe body parts in the heating gas flowing direction.

3. The heat exchanger according to claim 1,
wherein, in each of the fins, regions leading to parts in a vicinity of the outer circumference surfaces of the downstream pipe body parts from each pair of the cut-and-raised parts, the heating gas passing part, and upstream regions of the heating gas passing parts in the heating gas flowing direction are formed as first cutout parts connected in series.

4. The heat exchanger according to claim 1,
wherein each of the fins further comprises additional cut-and-raised parts which are provided on the downstream side of second gaps, formed between the downstream end parts of each pair of the cut-and-raised parts, in the heating gas flowing direction and are capable of causing the heating gas to move forward toward the outer circumference surfaces of the downstream pipe body parts after causing the heating gas passed through the second gap to collide therewith.

5. The heat exchanger according to claim 4,
wherein the additional cut-and-raised parts have substantially a same height in the heating gas flowing direction as downstream end parts on the outer circumference surfaces of the downstream pipe body parts in the heating gas flowing direction.

6. The heat exchanger according to claim 4,
wherein a slit is provided at a position on an upstream side in the heating gas flowing direction relative to the additional cut-and-raised parts.

7. The heat exchanger according to claim 4,
wherein, in an end edge part on the downstream side of each of the fins in the heating gas flowing direction, parts corresponding to the additional cut-and-raised parts have uneven shapes formed as second cutout parts that are further recessed than other parts.

8. The heat exchanger according to claim 1,
wherein the case, the heat transfer pipe, and the fins are made of stainless steel.

9. A water heating apparatus comprising:
the heat exchanger according to claim 1.

\* \* \* \* \*